US012633737B2

(12) United States Patent
Matsuda

(10) Patent No.: US 12,633,737 B2
(45) Date of Patent: May 19, 2026

(54) ABNORMALITY DETECTION APPARATUS

(71) Applicant: DENSO CORPORATION, Kariya-city (JP)

(72) Inventor: Kunihiko Matsuda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 193 days.

(21) Appl. No.: 18/670,477

(22) Filed: May 21, 2024

(65) Prior Publication Data

US 2024/0313523 A1 Sep. 19, 2024

Related U.S. Application Data

(63) Continuation of application No. PCT/JP2022/042558, filed on Nov. 16, 2022.

(30) Foreign Application Priority Data

Nov. 24, 2021 (JP) ................................. 2021-190218

(51) Int. Cl.
| | |
|---|---|
| *H02H 7/122* | (2006.01) |
| *H02M 1/32* | (2007.01) |
| *H02M 7/48* | (2007.01) |
| *H02M 7/5387* | (2007.01) |
| *H02P 27/06* | (2006.01) |

(52) U.S. Cl.
CPC ............ *H02H 7/1227* (2013.01); *H02M 1/32* (2013.01); *H02M 7/48* (2013.01); *H02M 7/5387* (2013.01); *H02M 7/53873* (2013.01); *H02P 27/06* (2013.01)

(58) Field of Classification Search
CPC ........ H02H 7/1227; H02M 1/32; H02M 7/48; H02M 7/5387; H02M 7/53873; H02P 27/06
See application file for complete search history.

(56) References Cited

U.S. PATENT DOCUMENTS

| | | | | |
|---|---|---|---|---|
| 9,570,902 | B2 * | 2/2017 | Morino .................. | H02H 3/093 |
| 10,093,351 | B2 * | 10/2018 | Kumagai ................ | H02P 27/08 |
| 10,232,874 | B2 * | 3/2019 | Maeshima ............ | B60L 3/0092 |
| 10,377,413 | B2 * | 8/2019 | Kumagai ................ | H02P 27/08 |
| 10,457,321 | B2 * | 10/2019 | Kumagai ........... | H03K 17/0822 |

(Continued)

FOREIGN PATENT DOCUMENTS

JP        S62-207022 A        9/1987

*Primary Examiner* — Michael J Jansen, II
(74) *Attorney, Agent, or Firm* — Precision Patents, P.C.

(57) ABSTRACT

A monitoring voltage output unit outputs a monitoring voltage that has a positive correlation with the current flowing through a shunt resistor connected in series with an upper arm element and a lower arm element of each phase. A monitoring circuit monitors an inverter overcurrent abnormality due to an upper arm element or a lower arm element of one or more phases being stuck in an ON state based on the monitoring voltage. A comparator of the monitoring circuit outputs an overcurrent flag of a pulse signal when the monitoring voltage is larger than a reference value. A determination unit determines that an inverter overcurrent is abnormal and stop energization of an inverter, when a cumulative output time of the overcurrent flag of at least one phase reaches a time threshold or when number of outputs of the overcurrent flag reaches a number threshold.

6 Claims, 12 Drawing Sheets

(56)　　　　　References Cited

U.S. PATENT DOCUMENTS

| | | | | | |
|---|---|---|---|---|---|
| 10,543,869 | B2 * | 1/2020 | Kumagai | ................ | B62D 6/00 |
| 10,601,301 | B2 * | 3/2020 | Terada | ................... | H02M 1/36 |
| 2015/0107934 | A1 * | 4/2015 | Morino | ............... | H02H 7/0856 |
| | | | | | 180/407 |
| 2017/0349207 | A1 * | 12/2017 | Maeshima | ........... | B60L 3/0092 |
| 2018/0208237 | A1 * | 7/2018 | Kumagai | ............... | H02M 7/48 |
| 2019/0023316 | A1 * | 1/2019 | Kumagai | ............... | H02M 1/36 |
| 2019/0023317 | A1 * | 1/2019 | Kumagai | ............... | H02P 27/08 |
| 2019/0031232 | A1 * | 1/2019 | Kumagai | ............... | H02P 27/06 |
| 2019/0181741 | A1 * | 6/2019 | Terada | ................ | H02M 3/158 |
| 2019/0353715 | A1 * | 11/2019 | Miki | ...................... | H02M 1/32 |

* cited by examiner

INITIAL CHECK OF MONITORING CIRCUIT

FIG. 9

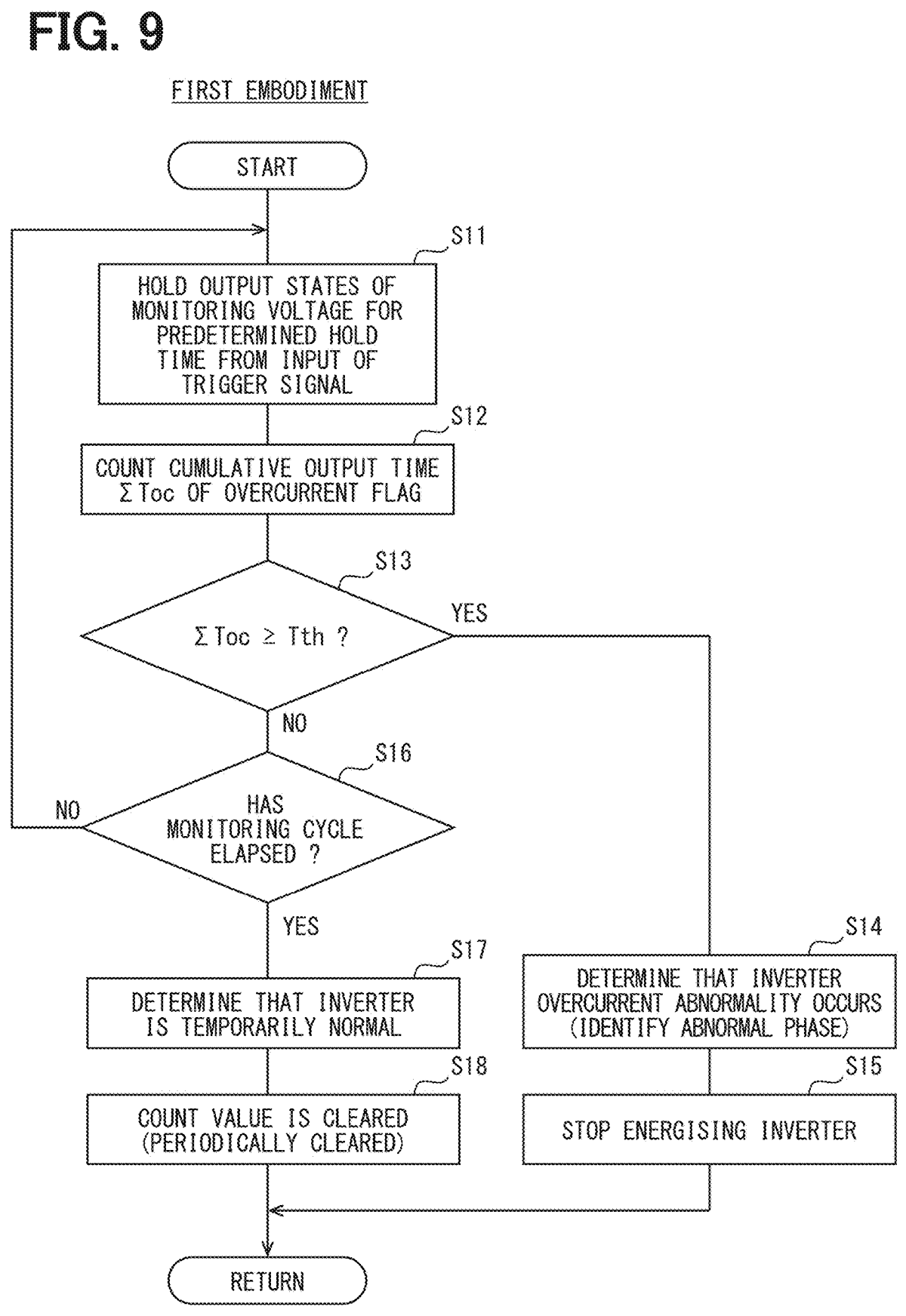

FIRST EMBODIMENT

```
                    ( START )
                        │
                        │                    S11
            ┌───────────────────────────┐
            │   HOLD OUTPUT STATES OF    │
            │   MONITORING VOLTAGE FOR   │
            │    PREDETERMINED HOLD      │
            │    TIME FROM INPUT OF      │
            │      TRIGGER SIGNAL        │
            └───────────────────────────┘
                        │                    S12
            ┌───────────────────────────┐
            │  COUNT CUMULATIVE OUTPUT TIME │
            │  ΣToc OF OVERCURRENT FLAG  │
            └───────────────────────────┘
                        │                    S13
                      ◇ ─────────────────── YES
                   ΣToc ≥ Tth ?
                      ◇
                        │ NO
                        │                    S16
                      ◇
          NO        HAS
         ◇──── MONITORING CYCLE
                  ELAPSED ?
                      ◇
                        │ YES
                        │                    S17
            ┌───────────────────────────┐
            │  DETERMINE THAT INVERTER   │
            │   IS TEMPORARILY NORMAL    │
            └───────────────────────────┘
                        │                    S18
            ┌───────────────────────────┐
            │  COUNT VALUE IS CLEARED    │
            │  (PERIODICALLY CLEARED)    │
            └───────────────────────────┘
                        │
                    ( RETURN )
```

S14

DETERMINE THAT INVERTER
OVERCURRENT ABNORMALITY OCCURS
(IDENTIFY ABNORMAL PHASE)

S15

STOP ENERGISING INVERTER

FIG. 10

SECOND EMBODIMENT

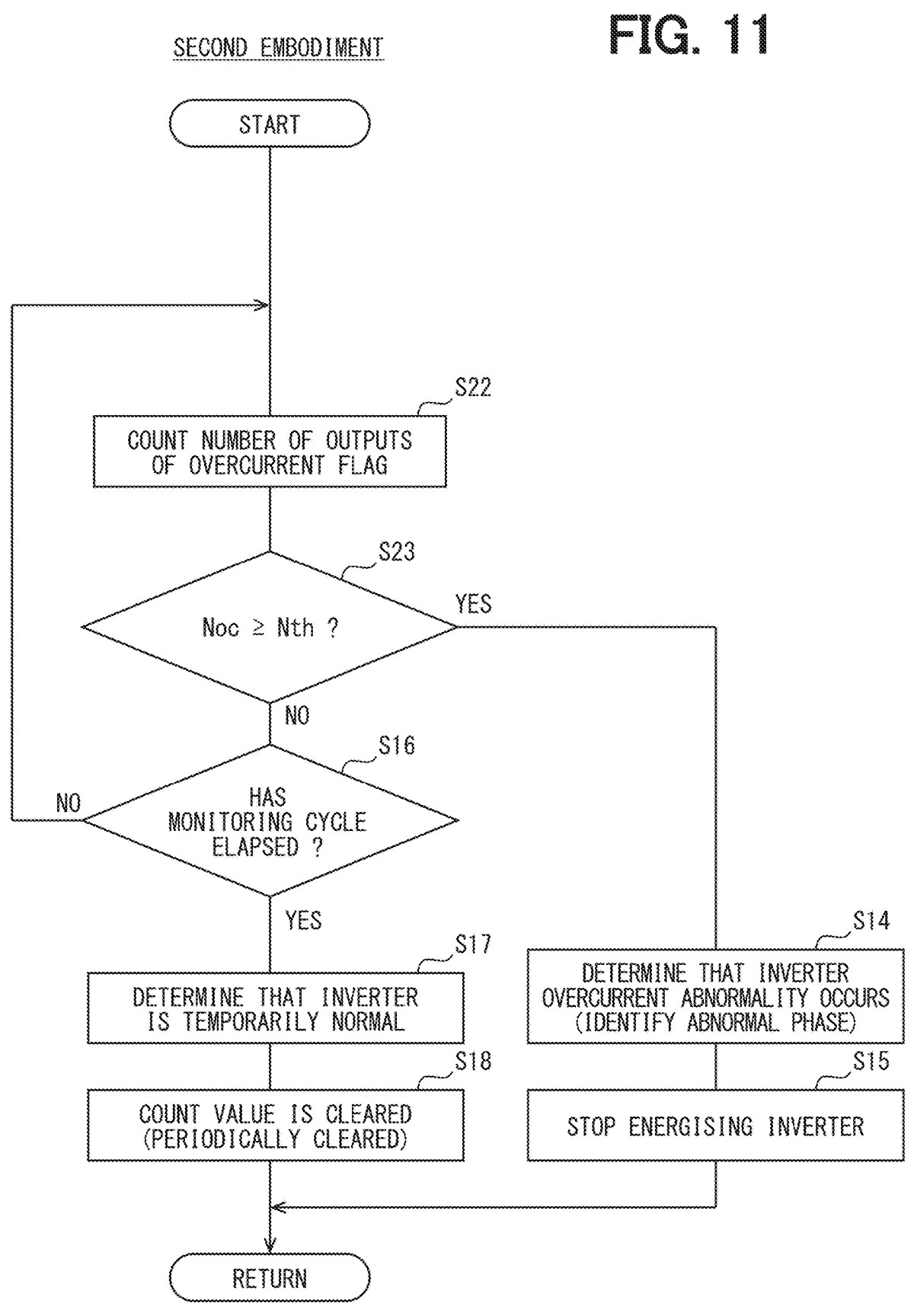

SECOND EMBODIMENT

FIG. 11

START

S22
COUNT NUMBER OF OUTPUTS OF OVERCURRENT FLAG

S23
Noc ≥ Nth ?

YES →

NO

S16
HAS MONITORING CYCLE ELAPSED ?

NO →

YES

S17
DETERMINE THAT INVERTER IS TEMPORARILY NORMAL

S18
COUNT VALUE IS CLEARED (PERIODICALLY CLEARED)

S14
DETERMINE THAT INVERTER OVERCURRENT ABNORMALITY OCCURS (IDENTIFY ABNORMAL PHASE)

S15
STOP ENERGISING INVERTER

RETURN

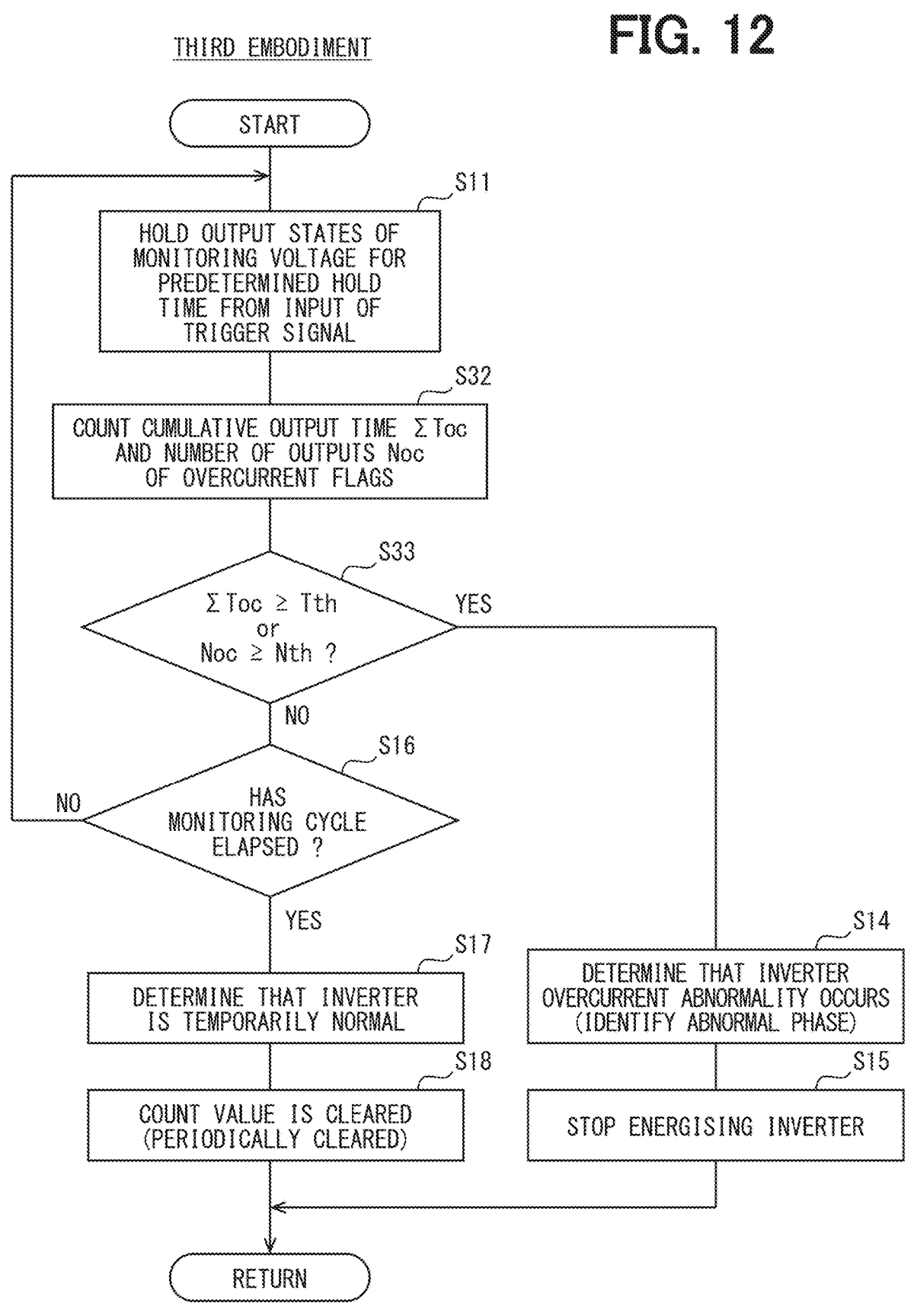

THIRD EMBODIMENT

FIG. 12

START

S11
HOLD OUTPUT STATES OF MONITORING VOLTAGE FOR PREDETERMINED HOLD TIME FROM INPUT OF TRIGGER SIGNAL

S32
COUNT CUMULATIVE OUTPUT TIME $\Sigma$Toc AND NUMBER OF OUTPUTS Noc OF OVERCURRENT FLAGS

S33
$\Sigma$Toc $\geq$ Tth or Noc $\geq$ Nth ?

YES

NO

S16
HAS MONITORING CYCLE ELAPSED ?

NO

YES

S17
DETERMINE THAT INVERTER IS TEMPORARILY NORMAL

S14
DETERMINE THAT INVERTER OVERCURRENT ABNORMALITY OCCURS (IDENTIFY ABNORMAL PHASE)

S18
COUNT VALUE IS CLEARED (PERIODICALLY CLEARED)

S15
STOP ENERGISING INVERTER

RETURN

ABNORMALITY DETECTION APPARATUS

CROSS REFERENCE TO RELATED APPLICATIONS

This application is a continuation application of International Patent Application No. PCT/JP2022/042558 filed on Nov. 16, 2022, which designated the U.S. and based on and claims the benefits of priority of Japanese Patent Application No. 2021-190218 filed on Nov. 24, 2021. The entire disclosure of all of the above applications is incorporated herein by reference.

TECHNICAL FIELD

The present disclosure relates to an abnormality detection apparatus.

BACKGROUND

Conventionally, an abnormality detection apparatus is known that detects a stuck ON abnormality of an inverter switching element (short circuit failure).

SUMMARY

An object of the present disclosure is to provide an abnormality detection apparatus that accurately detects an overcurrent abnormality caused by an inverter switching element being stuck in an ON state.

The abnormality detection apparatus of the present disclosure includes a control unit, a plurality of monitoring voltage output units, and a monitoring circuit. The control unit causes an upper arm element and a lower arm element to perform complementary switching operations in an inverter in which the upper arm element and the lower arm element of multiple phases are bridge-connected.

The monitoring voltage output unit outputs a monitoring voltage that has a positive correlation with the current flowing through a shunt resistor connected in series with the upper arm element and the lower arm element of each phase. The monitoring circuit monitors an inverter overcurrent abnormality due to an upper arm element or a lower arm element of one or more phases being stuck in the ON state based on the monitoring voltage during operation of the inverter.

The monitoring circuit includes a comparator and a determination unit. The comparator outputs an overcurrent flag as a pulse signal when the monitoring voltage is greater than a reference value.

When a cumulative output time of the overcurrent flag for at least one phase reaches a time threshold, or when the number of outputs of the overcurrent flag reaches a number threshold, the determination unit determines that there is an inverter overcurrent abnormality, and stops energization of an inverter.

BRIEF DESCRIPTION OF THE DRAWINGS

The above and other objects, features and advantages of the present disclosure will become more apparent from the following detailed description made with reference to the accompanying drawings. In the drawings:

FIG. 9 is a flowchart of inverter overcurrent abnormality detection according to the first embodiment;

FIG. 10 is a time chart of inverter overcurrent abnormality detection according to a second embodiment;

FIG. 11 is a flowchart of inverter overcurrent abnormality detection according to the second embodiment; and FIG. 12 is a flowchart of inverter overcurrent abnormality detection according to a third embodiment.

DETAILED DESCRIPTION

Figure 1:
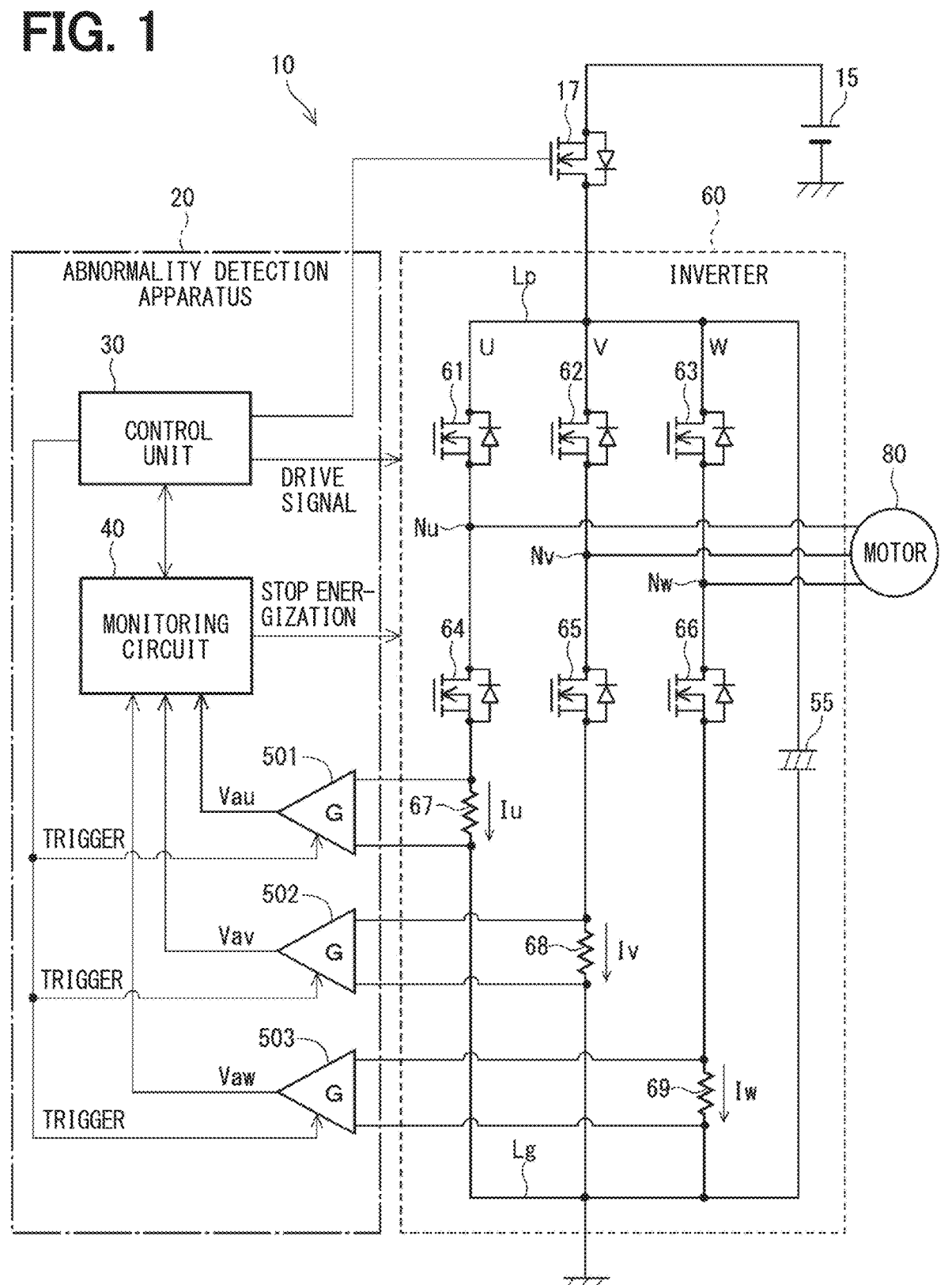
FIG. 1 is a configuration diagram of a three-phase motor drive device to which an abnormality detection apparatus of each embodiment is applied.

In an assumable example, an abnormality detection apparatus is known that detects a stuck ON abnormality of an inverter switching element (short circuit failure). For example, the apparatus detects a short-circuit failure in an upper arm element or a lower arm element based on a divided voltage at a connection point between an upper arm element and a lower arm element of each phase.

In the apparatus, the divided voltage at the connection point varies due to the ON resistance of the switching element (FET), etc., which may lead to erroneous detection.

An object of the present disclosure is to provide an abnormality detection apparatus that accurately detects an overcurrent abnormality caused by an inverter switching element being stuck in an ON state.

The abnormality detection apparatus of the present disclosure includes a control unit, a plurality of monitoring voltage output units, and a monitoring circuit. The control unit causes an upper arm element and a lower arm element to perform complementary switching operations in an inverter in which the upper arm element and the lower arm element of multiple phases are bridge-connected.

The monitoring voltage output unit outputs a monitoring voltage that has a positive correlation with the current flowing through a shunt resistor connected in series with the upper arm element and the lower arm element of each phase. The monitoring circuit monitors an inverter overcurrent abnormality due to an upper arm element or a lower arm element of one or more phases being stuck in the ON state based on the monitoring voltage during operation of the inverter.

The monitoring circuit includes a comparator and a determination unit. The comparator outputs an overcurrent flag as a pulse signal when the monitoring voltage is greater than a reference value.

When a cumulative output time of the overcurrent flag for at least one phase reaches a time threshold, or when the number of outputs of the overcurrent flag reaches a number threshold, the determination unit determines that there is an inverter overcurrent abnormality, and stops energization of an inverter.

In the present disclosure, by using the overcurrent flag that is generated based on the monitoring voltage that has a positive correlation with the current flowing through the shunt resistor, the inverter overcurrent abnormality can be detected with high accuracy without being affected by variations in ON resistance like the assumable example.

An anomaly detection apparatus according to a plurality of embodiments will be described based on the drawings. The abnormality detection apparatus of the present embodiment detects an inverter overcurrent abnormality caused by a switching element being stuck in an ON state in an inverter that converts DC power from a battery and supplies it to a load such as a motor. The abnormality detection apparatus of the present embodiment is applied, for example, to a motor drive device that drives a steering assist motor of an electric power steering device.

FIG. 1 shows a schematic configuration of a motor drive device 10 to which an abnormality detection apparatus 20 is applied. The DC (Direct Current) power of the battery 15 is converted into three-phase AC (Alternating Current) power by a switching operation of an inverter 60 and is supplied it to a motor 80. The motor 80 is a three-phase brushless motor.

In the inverter 60, three-phase upper and lower arm switching elements 61 to 66 are bridge-connected between a power supply line Lp and a ground line Lg. In the present embodiment, MOSFETs are used as the switching elements 61 to 66. Hereinafter, the switching element of the upper arm will be referred to as an "upper arm element", and the switching element of the lower arm will be referred to as a "lower arm element". The upper arm element 61 and the lower arm element 64 constitute a U-phase leg, the upper arm element 62 and the lower arm element 65 constitute a V-phase leg, and the upper arm element 63 and the lower arm element 66 constitute a W-phase leg. The inter-arm connection points Nu, Nv, and Nw of each phase are connected to the motor windings. A motor relay may be provided between the inter-arm connection points Nu, Nv, Nw and the motor winding.

A shunt resistor 67 is connected in series to the upper arm element 61 and the lower arm element 64 for U-phase, a shunt resistor 68 is connected in series to the upper arm element 62 and lower arm element 65 for V-phase, and a shunt resistor 69 is connected in series to the upper arm element 63 and the lower arm element 66 of W-phase. In the configuration example of FIG. 1, the shunt resistors 67, 68, and 69 are respectively connected to the low potential sides of the lower arm elements 64, 65, and 66. Further, a smoothing capacitor 55 made of an aluminum electrolytic capacitor or the like is connected between the power supply line Lp and the ground line Lg in parallel with the upper elements and the lower arm elements of each phase.

A reverse connection protective relay 17 is provided midway along the power supply line Lp from the battery 15 to the inverter 60. The reverse connection protective relay 17 cuts off a current from the inverter 60 side to the battery 15 side when the reverse connection protective relay 17 is in the OFF state. A power supply relay may be further provided between the battery 15 and the reverse connection protection relay 17 to cut off the current from the battery 15 side to the inverter 60 side when the power supply relay is in the OFF state.

By the way, when any one of the switching elements 61 to 66 of the inverter 60 is stuck in the ON state, a through current flows from the power supply line Lp to the ground line Lg during the ON period of another normal element forming an upper and lower pair with that element. For example, an excessive through-current may flow due to the instantaneous discharge of the charge charged in the smoothing capacitor 55. In this specification, an abnormality in which a through current flows due to an upper arm element or a lower arm element of one or more phases being stuck in the ON state is defined as an "inverter overcurrent abnormality". When the current is continued in a state of the inverter overcurrent abnormality, there is a risk of damage tot the board and elements.

For example, in the conventional technology disclosed in Patent Document 1 (Japanese Unexamined Patent Publication No. 2018-113851), the divided voltages at the inter-arm connection points Nu, Nv, and Nw vary due to the ON resistance of the switching element, etc., which may lead to erroneous detection. Therefore, the abnormality detection apparatus 20 of the present embodiment aims to detect an inverter overcurrent abnormality with high precision and stop energization of the inverter 60 at an early stage, thereby preventing the occurrence of the malfunction.

The abnormality detection apparatus 20 includes a control unit 30, a monitoring circuit 40, and three amplifiers 501, 502, and 503 as "monitoring voltage output unit".

The control unit 30 includes a microcomputer, a pre-driver, and the like, and has a CPU (not shown), a ROM, a RAM, an I/O, a bus line connecting these configurations, and the like. The control unit 30 performs required control by executing software processing or hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit. The monitoring circuit 40 is composed of, for example, a customized IC.

The control unit 30 causes the upper arm elements 61, 62, and 63 and the lower arm elements 64, 65, and 66 of the inverter 60 to perform complementary switching operations. During a normal operation when the inverter 60 is normal, the control unit 30 instructs the inverter 60 to issue a drive signal so that the motor 80 outputs the required torque using a common motor control technologies such as vector control and current feedback control. In addition, the control unit 30 operates the reverse connection protection relay 17 and the like.

The amplifiers 501, 502, and 503 output to the monitoring circuit 40 the monitoring voltages Vau, Vav, and Vaw that have a positive correlation with the current flowing through the shunt resistors 67, 68, and 69 of each phase, respectively. Specific characteristics of the monitoring voltages Vau, Vav, and Vaw with respect to current will be described later with reference to FIG. 4. Further, the trigger signals input from the control unit 30 to the amplifiers 501, 502, and 503 of each phase will be described later with reference to FIG. 7.

The monitoring circuit 40 monitors the inverter overcurrent abnormality based on the monitoring voltages Vau, Vav, and Vaw input from the amplifiers 501, 502, and 503. When it is determined that there is the inverter overcurrent abnormality, the monitoring circuit 40 turns off all inverter switching elements 61 to 66 and stops energizing the inverter 60. The possibility of a double failure in which the upper arm element and lower arm element of the same phase are stuck in the ON state at the same time is not assumed. Therefore, when either the upper arm element or the lower arm element is stuck in the ON state, the other element is always turned OFF, thereby preventing a through current.

Furthermore, when the monitoring circuit 40 determines that the inverter overcurrent abnormality occurs, it notifies the control unit 30 of the abnormality. Furthermore, in an initial check of the monitoring circuit 40, which will be described later, the control unit 30 diagnoses whether the monitoring circuit 40 functions normally when a monitoring voltage for diagnosis is input.

Figure 2:
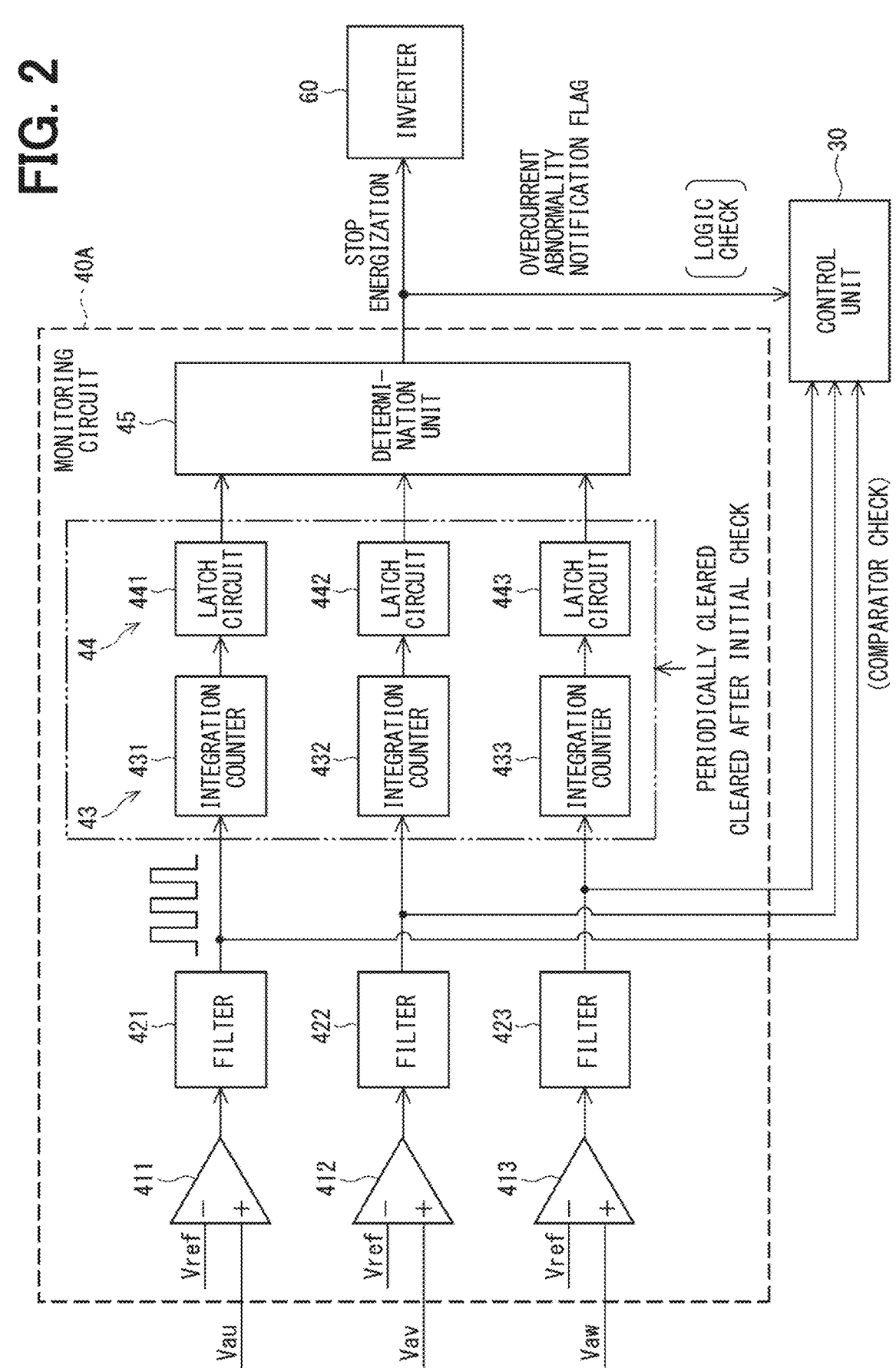
FIG. 2 is a block diagram of a monitoring circuit in one configuration example.

FIG. 2 shows a block diagram of one configuration example of the monitoring circuit 40A. The monitoring circuit 40 includes the comparators 411, 412, and 413, the filters 421, 422, and 423, the integration counters 431, 432, and 433, and the latch circuits 441, 442, and 443 for each phase. The numbers "1", "2", and "3" at the end of the symbols correspond to the U phase, V phase, and W phase, respectively. The monitoring circuit 40 also includes a determination unit 45 common to the three phases. Until input to the determination unit 45, similar processing is performed for each phase in parallel.

The comparators 411, 412, and 413 output an overcurrent flag of a pulse signal when the monitoring voltages Vau, Vav, and Vaw input from the amplifiers 501, 502, and 503 are larger than a reference value Vref. The filters 421, 422, and 423 remove noise when ON and OFF as high frequency components superimposed on the overcurrent flag. The integration counters 431, 432, and 433 count the cumulative output time or number of outputs of the overcurrent flag, as will be described in detail later. The latch circuits 441, 442, and 443 hold the count value from the integration counters 431, 432, and 433.

The count value of the integration counters 431, 432, and 433 and the latch circuits 441, 442, and 443 are periodically cleared every time each monitoring cycle passes, as will be described later with reference to FIGS. 6 and 10. This prevents instantaneous erroneous detection results from accumulating and determining abnormality. Further, the count value is also cleared even after it is intentionally counted up in the initial check of the monitoring circuit 40, which will be described later.

The determination unit 45 compares the count value held in the latch circuits 441, 442, and 443 of each phase with a threshold value, and determines by OR operation that the count value is greater than or equal to the threshold value. That is, when the count value is equal to or greater than the threshold value for at least one phase, the determination unit 45 determines that the inverter overcurrent abnormality occurs, and stops energizing the inverter 60.

Figure 3:
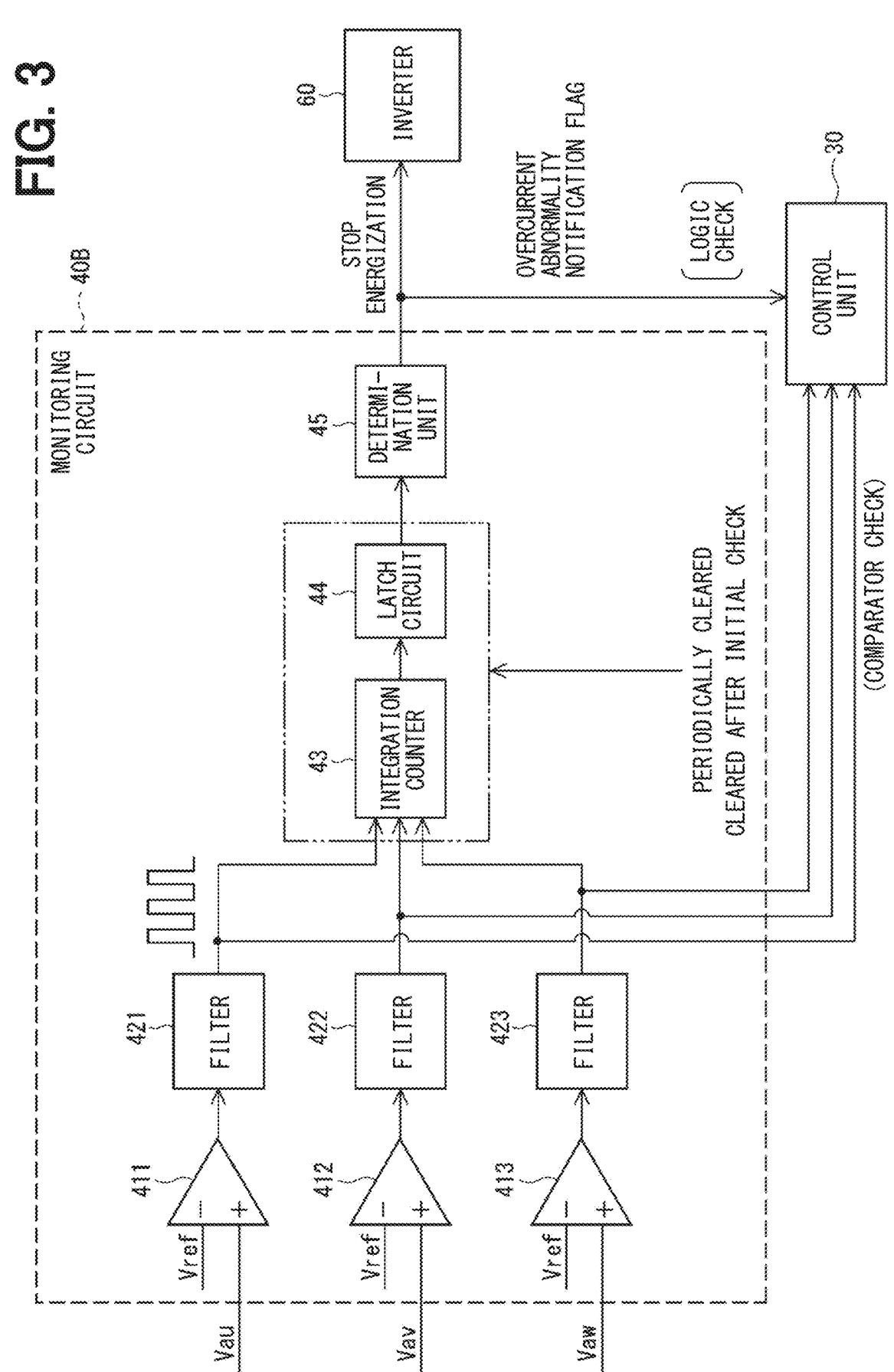
FIG. 3 is a block diagram of a monitoring circuit of another configuration example.

FIG. 3 shows a block diagram of another configuration example of the monitoring circuit 40B. Substantially the same configurations in FIG. 2 are denoted by the same reference numerals, and the description thereof will be omitted. In contrast to the monitoring circuit 40A in FIG. 2, the monitoring circuit 40B in FIG. 3 includes one set of integration counter 43 and latch circuit 44 common to three phases. The integration counter 43 counts the total cumulative output time or number of outputs for the three phases for the overcurrent flags input from the filters 421, 422, and 423 of each phase. The latch circuit 44 holds the total count value for the three phases by the integration counter 43. The other configuration of the monitoring circuit 40B is the same as that of the monitoring circuit 40A.

When the total count value for the three phases is equal to or greater than the threshold value, the determination unit 45 considers that the total count value are equal to or greater than the threshold value for at least one phase, determines that the inverter overcurrent abnormality occurs, and stops energizing the inverter 60. A mounting area of the monitoring circuit 40B can be reduced by reducing the number of integration counters and latch circuits compared to the monitoring circuit 40A.

Hereinafter, items common to the configuration examples of FIGS. 2 and 3 will be referred to as "monitoring circuit 40" without distinguishing between the reference numerals of the monitoring circuits 40A and 40B. Furthermore, the three-phase integration counters 431, 432, and 433 and latch circuits 441, 442, and 443 in the configuration example of FIG. 2 are collectively referred to as "integration counter 43" and "latch circuit 44." The integration counter 43 in the configuration example of FIG. 2 counts the cumulative output time or the number of outputs of the overcurrent flag for each phase, and the latch circuit 44 holds the counter value. The integration counter 43 in the configuration example of FIG. 3 counts the total cumulative output time or total number of outputs of the overcurrent flag for the three-phase, and the latch circuit 44 holds the counter value.

As described above, the monitoring circuit 40 can prevent the occurrence of problems due to continued energization in a state of inverter overcurrent abnormality, and can improve the reliability of the system. However, when the monitoring circuit 40 becomes stuck on the normal determination side and fails, there is a problem that the monitoring function is lost. Therefore, in the present embodiment, the control unit 30 performs an initial check of the monitoring circuit 40.

In the initial check of the monitoring circuit 40, the control unit 30 causes the amplifiers 501, 502, and 503 of each phase to output a voltage larger than the reference value to the comparators 411, 412, and 413 as a diagnostic monitoring voltage. For example, a diagnostic monitoring voltage of 5V is output for a comparator reference value Vref of 4V. The control unit 30 acquires the output signals from the filters 421, 422, and 423 to the integration counter 43, and diagnoses whether the overcurrent flag is correctly output. This is called a "comparator check."

Further, as will be described later, the control unit 30 diagnoses that the determination unit 45 determines that an inverter overcurrent abnormality occurs when the cumulative output time or the number of outputs of the diagnostic monitoring voltage satisfies the abnormality determination condition. Specifically, it is diagnosed that an overcurrent abnormality notification flag is transmitted from the monitoring circuit 40 to the control unit 30. This is called a "logic check."

Figure 4:
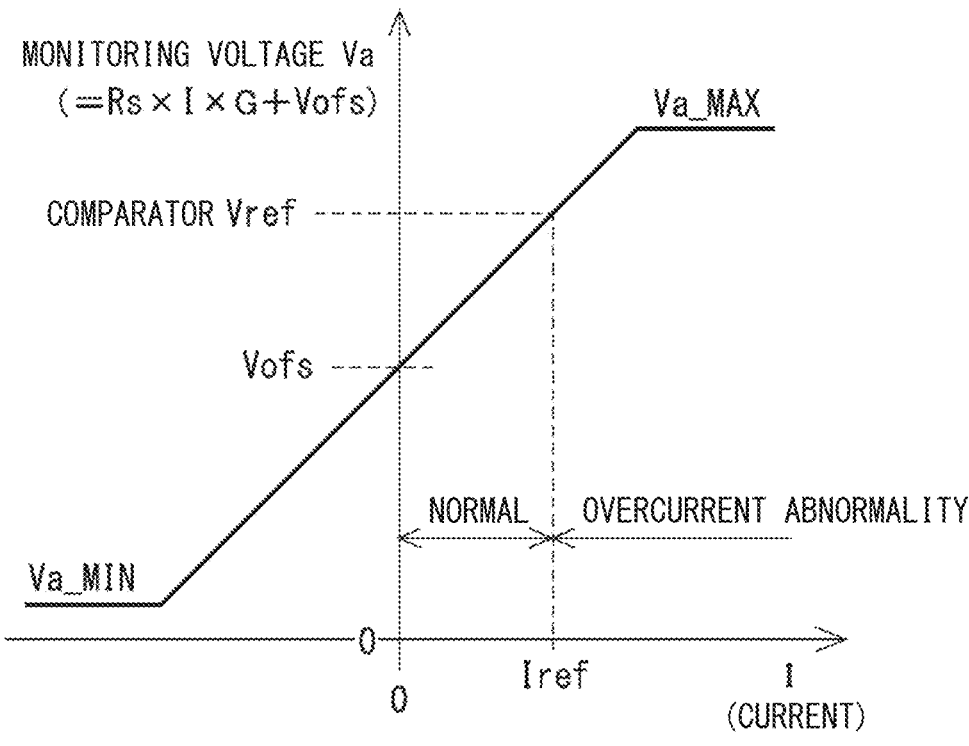
FIG. 4 is a characteristic diagram of a monitoring voltage (amplifier output) with respect to the current flowing through a shunt resistor.

FIG. 4 shows the characteristics of the monitoring voltage Va (amplifier output) with respect to the current I flowing through the shunt resistors 67, 68, and 69. The monitoring voltage Va is a term that includes the monitoring voltages Vau, Vav, and Vaw of each phase. The resistance values of the shunt resistors 67, 68, and 69 are defined as Rs, the gains of the amplifiers 501, 502, and 503 are defined as G ($\geq$1), and the amplifier output when the current I is 0 is defined as an offset voltage Vofs. The monitoring voltage Va has a linear characteristic expressed by a formula "Va=Rs×I×G+Vofs" in the range from a lower limit value Va_min to an upper limit value Va_max of the amplifier output.

The offset voltage Vofs is set so that the monitoring voltage Va becomes positive even when a negative current I (<0) flows from the low potential side to the high potential side of the shunt resistors 67, 68, and 69. The present embodiment basically assumes a situation in which the current I is 0 or a positive current I flows from the high potential side to the low potential side of the shunt resistors 67, 68, and 69.

The comparator reference value Vref is set to a value greater than the offset voltage Vofs and smaller than the monitoring voltage upper limit value Va_max. A current region on the characteristic line where the current is less than the reference current Iref corresponding to the comparator reference value Vref is regarded as a normal current region that may flow during normal operation. A current region equal to or higher than the reference current Iref is determined to be an overcurrent abnormality region.

Figure 5:
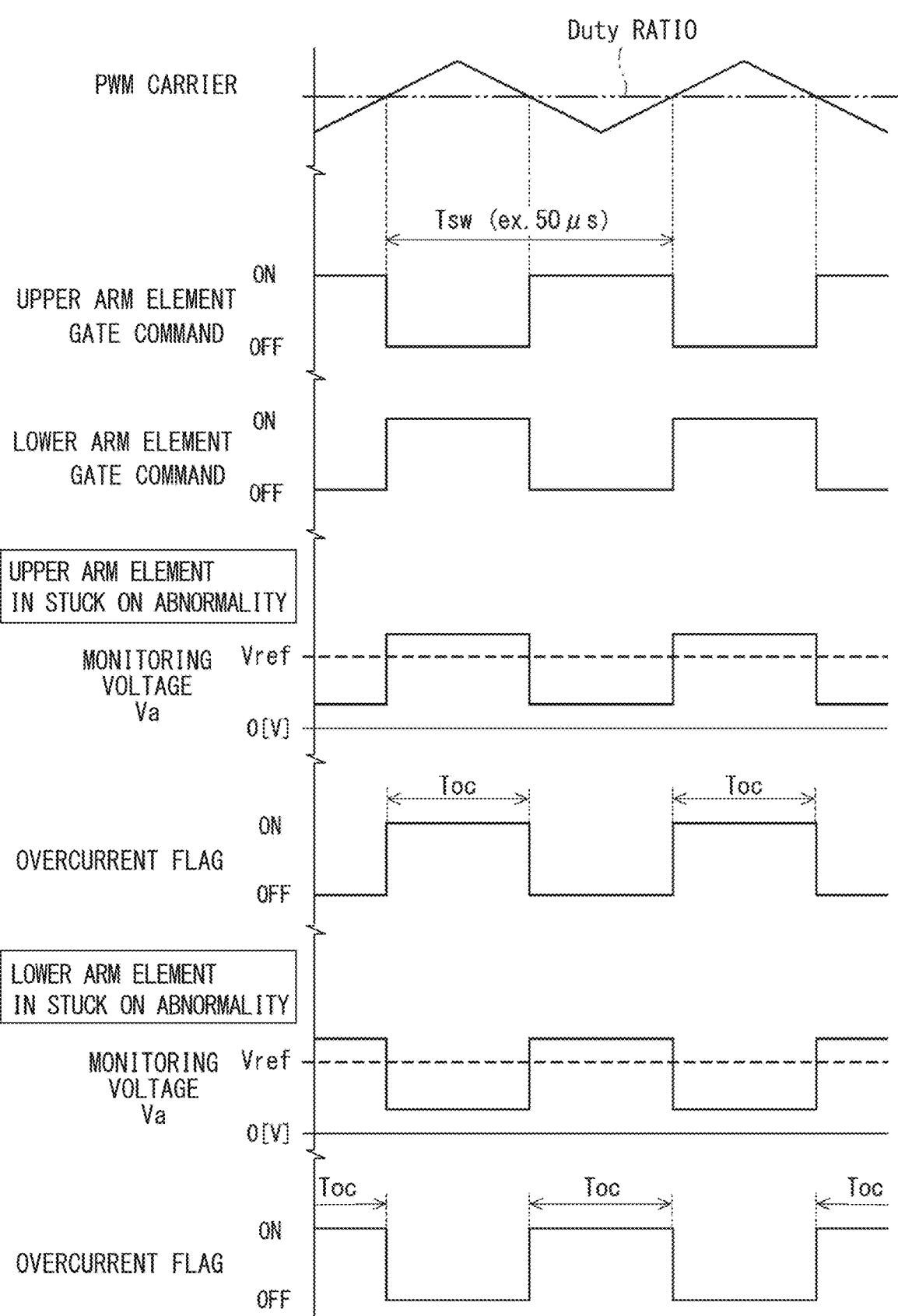
FIG. 5 is a time chart illustrating a monitoring voltage and an overcurrent flag when the upper arm element or the lower arm element has a stuck ON abnormality.

With reference to the time chart of FIG. 5, a description will be given of changes in the monitoring voltage Va and the overcurrent flag when the upper arm element or the lower arm element has the stuck ON abnormality. Hereinafter, the duty ratio means the ratio of the ON period of the upper arm element to the switching period. When the Duty ratio is larger than the PWM carrier, the gate command for the upper arm element turns ON, and the gate command for the lower arm element turns OFF. When the upper arm element has the stuck ON abnormality, a through current flows while the gate command of the upper arm element turns OFF, and the monitoring voltage Va exceeds the comparator reference value Vref, so the overcurrent flag turns ON. The time during which the overcurrent flag is outputted as ON is expressed as output time Toc. Similarly, when the lower arm element has the stuck ON abnormality, a through current flows while the gate command of the lower arm element turns OFF, and the monitoring voltage Va exceeds the comparator reference value Vref, so the overcurrent flag turns ON.

However, since the overcurrent flag may accidentally turn ON due to noise or the like, it is not appropriate to determine an abnormality based on one-time overcurrent flag. Therefore, the monitoring circuit 40 of the present embodiment determines that there is the inverter overcurrent abnormality when the cumulative output time or the number of outputs of the overcurrent flag exceeds the threshold value. The details will be explained below in the order of the first to third embodiments.

First Embodiment

Figure 6:
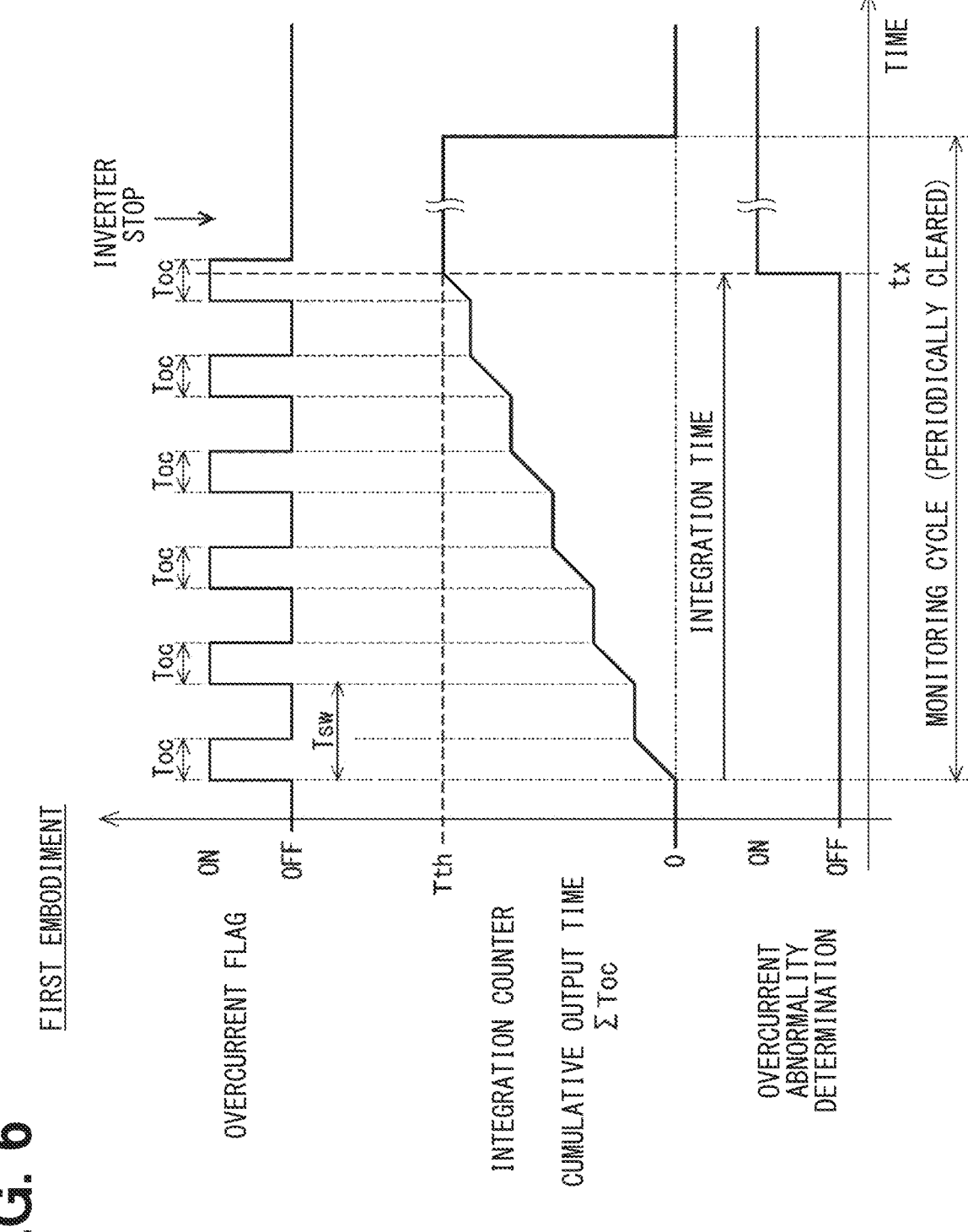
FIG. 6 is a time chart of inverter overcurrent abnormality detection according to a first embodiment.

FIG. 6 shows a time chart of inverter overcurrent abnormality detection according to a first embodiment. The integration counter 43 counts the cumulative output time $\Sigma$Toc obtained by accumulating the output time Toc of the overcurrent flag each time. When the overcurrent flag turns ON, the counter value increases, and when the overcurrent flag turns OFF, the counter value does not change. For example, when the cumulative output time $\Sigma$Toc reaches the time threshold Tth at time tx during the sixth overcurrent flag output, the determination unit 45 determines that an inverter overcurrent is abnormal and stops energizing the inverter 60. When a predetermined monitoring cycle has elapsed since the start of integration, the integration counter 43 is periodically cleared.

By the way, when the upper arm element is stuck in the ON state when the duty ratio is close to 0%, or when the lower arm element is stuck in the ON state when the duty ratio is close to 100%, the time for the through current to flow becomes shorter, and the output time Toc of the overcurrent flag becomes shorter. Therefore, there is a problem that it takes a long time for the cumulative output time $\Sigma$Toc to reach the time threshold Tth, and the abnormality detection is delayed.

Figure 7:
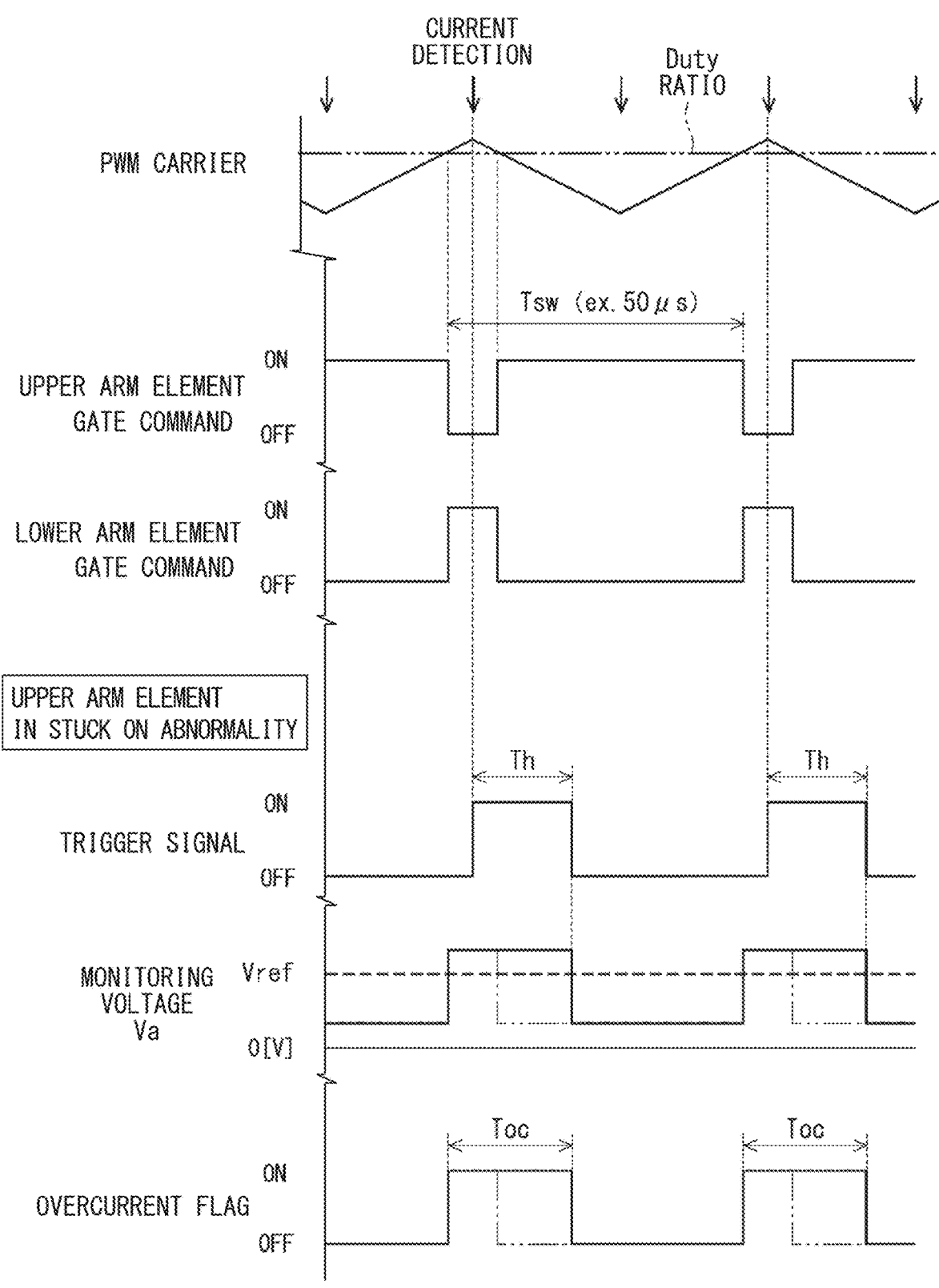
FIG. 7 is a time chart when an output of the monitoring voltage is held.

Therefore, in the first embodiment, as shown in FIG. 7, the output states of the monitoring voltages Vau, Vav, and Vaw of the amplifiers 501, 502, and 503 are held for a predetermined hold time from the input of the trigger signal. The trigger signal is output from the control unit 30 to each amplifier 501, 502, and 503 when an overcurrent is detected, for example, at the timing of the peak and valley of the PWM carrier. During a period in which the duty ratio is constant, the center of the pulse of the gate signal of the upper arm element and the lower arm element becomes an output timing of the trigger signal.

Regarding the monitoring voltage Va and overcurrent flag in FIG. 7, a two-dot chain line indicates the case where the monitoring voltage Va is not held, and a solid line indicates the case where the monitoring voltage Va is held. A hold time Th from the input of the trigger signal is set to, for example, about 10 μs, which corresponds to a sample hold time of the current sensor.

In an example where the switching period is 50 μs and the duty ratio is 10%, the output time Toc of the overcurrent flag when the monitoring voltage Va is not held is 5 μs. When holding the monitoring voltage Va, the trigger signal is input after (5/2)=2.5 μs after the overcurrent flag turns ON, and when the hold time Th is 10 μs, the output time Toc of the overcurrent flag becomes 12.5 μs. Therefore, the time required for the cumulative output time $\Sigma$Toc to reach the time threshold Tth can be shortened to 40%.

Figure 8:
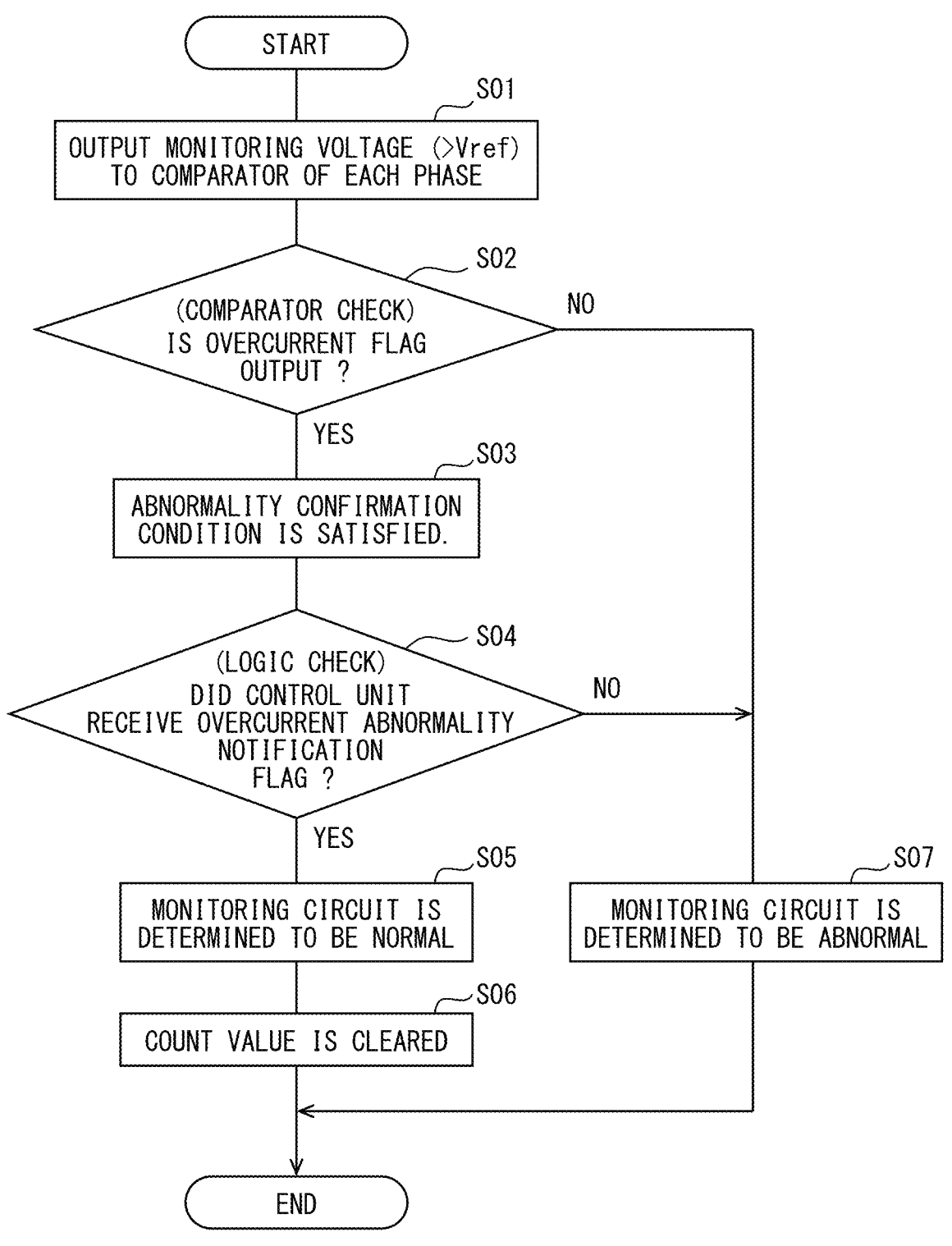
FIG. 8 is a flowchart of an initial check of the monitoring circuit.

FIG. 8 shows a flowchart of the initial check of the monitoring circuit. In the following description of the flowchart, the symbol "S" denotes a step. In S01, the amplifiers 501, 502, and 503 output voltage larger than the reference value Vref to the comparators 411, 412, and 413 of each phase as monitoring voltage for diagnosis. The amplifiers 501, 502, and 503 output a diagnostic monitoring voltage of, for example, 5V for a comparator reference value Vref of 4V for a time equal to or longer than the time threshold Tth, thereby intentionally generating an overcurrent flag.

In S02, as the comparator check, it is diagnosed that the comparators 411, 412, and 413 of each phase output an overcurrent flag. When the overcurrent flag is correctly output, YES is determined in S02, and the process proceeds to S03. In the first embodiment, the abnormality confirmation condition in S03 is satisfied when the cumulative output time of the diagnostic monitoring voltage reaches the time threshold Tth.

In S04, as a logic check, it is diagnosed that the determination unit 45 determines that there is the inverter overcurrent abnormality and outputs the overcurrent abnormality notification flag. When the control unit 30 correctly receives the overcurrent abnormality notification flag, YES is determined in S04. As a result, the monitoring circuit 40 is determined to be normal in S05. In S06, the count values of the integration counter 43 and latch circuit 44 are cleared, the initial check is completed, and the normal operation can be started.

On the other hand, when the overcurrent flag is not output in the comparator check, NO is determined in S02, and when the control unit 30 does not receive the overcurrent abnormality notification flag in the logic check, NO is determined in S04. In these cases, the monitoring circuit 40 is determined to be abnormal in S07, and abnormality measures such as prohibition of normal operation and warning are executed.

FIG. 9 shows a flowchart of inverter overcurrent abnormality detection according to the first embodiment. In the flowcharts for inverter overcurrent abnormality detection in the first to third embodiments, substantially the same steps are given the same step numbers and their explanations will be omitted.

In S11, the amplifiers 501, 502, and 503 of each phase hold the output states of the monitoring voltages Vau, Vav, and Vaw for a predetermined hold time Th from the input of the trigger signal. In S12, the integration counter 43 counts the cumulative output time $\Sigma$Toc of the overcurrent flag for each phase or the total of three phases, and the latch circuit

44 holds the count value. In S13, it is determined whether the cumulative output time ΣToc of the overcurrent flag has reached the time threshold Tth.

When YES is determined in S13, the determination unit 45 determines that the inverter overcurrent abnormality occurs in S14, and stops energizing the inverter 60 in S15. Here, the control unit 30 or the monitoring circuit 40 may be configured to be able to identify an abnormal phase in which the upper arm element or the lower arm element is stuck in the ON state based on the outputs of the comparators 411, 412, and 413 of each phase.

When NO is determined in S13, the process proceeds to S16, and it is determined whether the monitoring cycle has elapsed. At the time when the monitoring cycle has not yet elapsed, NO is determined in S16, and the processes of S11 to S13 are repeated. When the monitoring cycle has elapsed, YES is determined in S16, and the process proceeds to S17. In S17, the determination unit 45 determines that the inverter 60 is temporarily normal. "Tentatively normal" means that no abnormality was detected in the monitoring cycle. In S18, the count values of the integration counter 43 and the latch circuit 44 are cleared (i.e., periodically cleared). Thereafter, the entire routine is returned and overcurrent abnormality detection during inverter operation is continued.

As described above, in the present embodiment, by using the overcurrent flag generated based on the monitoring voltages Vau, Vav, and Vaw, the inverter overcurrent abnormality can be detected with high accuracy without being affected by variations in ON resistance like the prior art of Patent Document 1.

Second Embodiment

Next, the inverter overcurrent abnormality detection according to a second embodiment will be described with reference to FIGS. 10 and 11. In the second embodiment, the integration counter 43 of the monitoring circuit 40 counts the number of outputs Noc of the overcurrent flag. When the number of outputs Noc is equal to or greater than the number threshold Nth, the determination unit 45 determines that the inverter overcurrent abnormality occurs.

Figure 10:
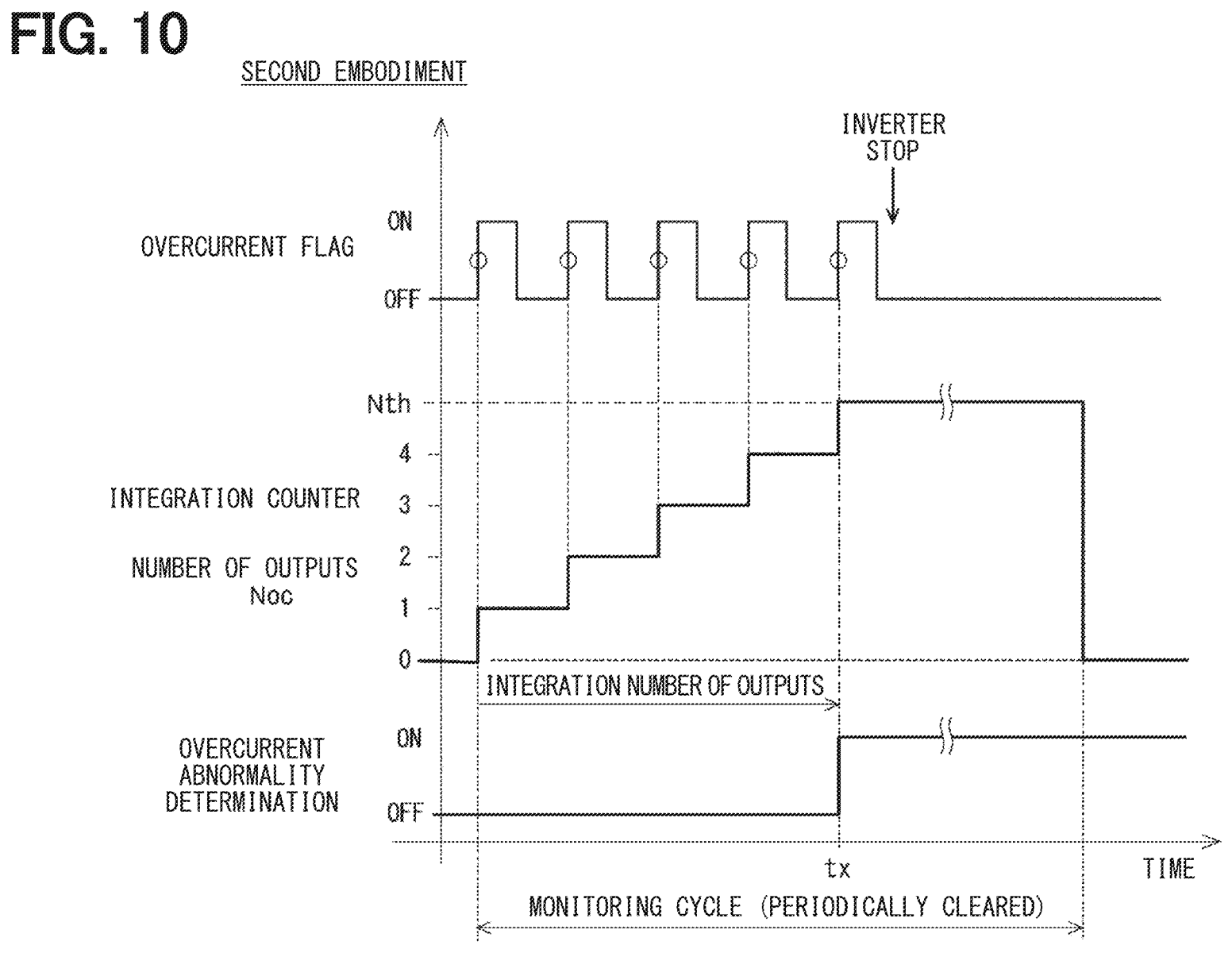

As shown in the time chart of FIG. 10, the integration counter 43 detects and counts a rising edge of the overcurrent flag. For example, when the number threshold Nth is set to 5 times, it is determined that the inverter overcurrent abnormality occurs at time tx when the fifth rising edge of the overcurrent flag is detected from the start of counting.

In the flowchart of the second embodiment shown in FIG. 11, in contrast to the first embodiment, S11 in FIG. 9 is not included, and S22 and S23 are included instead of S12 and S13. In S22, the integration counter 43 counts the number of outputs Noc of the overcurrent flag for each phase or the total of three phases, and the latch circuit 44 holds the count value. In S23, it is determined whether the number of outputs Noc of the overcurrent flag has reached the number threshold Nth.

As in the first embodiment, when YES is determined in S23, the determination unit 45 determines that the inverter overcurrent abnormality occurs in S14, and stops energizing the inverter 60 in S15. When NO is determined in S23 and it is determined in S16 that the monitoring cycle has elapsed, the determination unit 45 determines in S17 that the inverter 60 is provisionally normal.

In the initial check of the monitoring circuit 40 of the second embodiment, the amplifiers 501, 502, and 503 intermittently output a diagnostic monitoring voltage of 5V for a comparator reference value Vref of 4V, for example, a plurality of times equal to or higher than the number threshold Nth. In S03 of the flowchart in FIG. 8, the abnormality confirmation condition is satisfied when the number of outputs of the diagnostic monitoring voltage reaches the number threshold Nth.

The second embodiment is applicable except for the case where the upper arm element or the lower arm element is operated under the condition that it is always ON (that is, the duty ratio is 100% or 0%), and the overcurrent flag is continuously output over a plurality of cycles when it is stuck in the ON state. Assuming that the Duty ratio is greater than 0% and less than 100%, in the second embodiment, when the switching period Tsw is constant, the count proceeds at a constant speed regardless of the duty ratio, so the timing at which the number of outputs Noc reaches the threshold value Nth is constant. Therefore, when the time during which the through current flows is relatively short, the inverter overcurrent abnormality can be detected earlier in comparison with the first embodiment.

Third Embodiment

With reference to FIG. 12, the inverter overcurrent abnormality detection according to a third embodiment will be described. The third embodiment is a combination of the first embodiment and the second embodiment. The monitoring circuit 40 includes two types of integration counters 43, one for integrating the cumulative output time of the overcurrent flag and one for integrating the number of outputs, and counts both the cumulative output time ΣToc and the number of outputs Noc in parallel.

The determination unit 45 determines that there is the inverter overcurrent abnormality at the earliest timing of when the cumulative output time ΣToc of the overcurrent flag reaches the time threshold Tth for at least one phase, or when the number of outputs Noc of the overcurrent flag reaches the number threshold Nth.

The flowchart of the third embodiment includes S32 and S33 instead of S12 and S13 in FIG. 9. In S32, the two types of integration counters 43 count the cumulative output time ΣToc and the number of outputs Noc of the overcurrent flags for each phase or the total of three phases, and the values are held by the latch circuits 44 corresponding to the two types of integration counters 43, respectively. In S33, it is determined whether the cumulative output time ΣToc of the overcurrent flag has reached the time threshold Tth, or whether the number of outputs Noc of the overcurrent flag has reached the number threshold Nth. Other steps are similar to those shown in FIGS. 9 and 11.

In the third embodiment, the determination unit 45 determines that there is the inverter overcurrent abnormality at the timing when either the cumulative output time ΣToc or the number of outputs Noc reaches the threshold value earlier, depending on the duty ratio and the like. Reliability is further improved because the inverter overcurrent abnormality can be detected earlier and energization of the inverter 60 can be stopped.

Other Embodiments (a) The load to which the inverter 60 supplies power is not limited to the three-phase motor 80, but may be a polyphase motor other than three-phase, an actuator other than a motor, or the like. The number of switching elements on the upper and lower arms of the inverter is not limited to three sets, but may be one set or more.

(b) The inverter switching elements 61 to 66 may be composed of other semiconductor switching elements such as FETs other than MOSFETs and bipolar transistors.

(c) The shunt resistors 67, 68, and 69 may be provided not on the low potential side of the lower arm elements 64, 65, and 66 but on the high potential side of the upper arm elements 61, 62, and 63.

(d) The current-monitoring voltage characteristics of the monitoring voltage output unit are not limited to the linear characteristics shown in FIG. 4. It is only necessary that the monitored voltage has a positive correlation with the current and that the monitored voltage corresponding to the current in the abnormal overcurrent region can be identified as an abnormal value, and for example, the current-monitoring voltage characteristics of the monitoring voltage output unit may have a stepped or curved characteristic.

The present disclosure should not be limited to the embodiment described above. Various other embodiments may be implemented without departing from the scope of the present disclosure.

The control unit and the technique according to the present disclosure may be achieved by a dedicated computer provided by constituting a processor and a memory programmed to execute one or more functions embodied by a computer program. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. An abnormality detection apparatus, comprising:
   a control unit configured to cause an upper arm element and a lower arm element to perform complementary switching operations in an inverter in which the upper arm element and the lower arm element of multiple phases are bridge-connected;
   a monitoring voltage output unit configured to output a monitoring voltage that has a positive correlation with current flowing through a shunt resistor connected in series with the upper arm element and the lower arm element of each phase; and
   a monitoring circuit configured to monitor an inverter overcurrent abnormality due to an upper arm element or a lower arm element of one or more phases being stuck in an ON state based on the monitoring voltage during operation of the inverter,
   wherein the monitoring voltage output unit holds an output state of the monitoring voltage for a predetermined hold time from input of a trigger signal,
   the monitoring circuit includes
      a comparator configured to output an overcurrent flag of a pulse signal when the monitoring voltage is larger than a reference value, and
      a determination unit configured to determine that an inverter overcurrent is abnormal and stop energization of the inverter, when a cumulative output time of the overcurrent flag of at least one phase reaches a time threshold.

2. An abnormality detection apparatus, comprising:
   a control unit configured to cause an upper arm element and a lower arm element to perform complementary switching operations in an inverter in which the upper arm element and the lower arm element of multiple phases are bridge-connected;
   a monitoring voltage output unit configured to output a monitoring voltage that has a positive correlation with current flowing through a shunt resistor connected in series with the upper arm element and the lower arm element of each phase; and
   a monitoring circuit configured to monitor an inverter overcurrent abnormality due to an upper arm element or a lower arm element of one or more phases being stuck in an ON state based on the monitoring voltage during operation of the inverter,
   wherein
   the monitoring voltage output unit holds an output state of the monitoring voltage for a predetermined hold time from input of a trigger signal,
   the monitoring circuit includes
      a comparator configured to output an overcurrent flag of a pulse signal when the monitoring voltage is larger than a reference value, and
      a determination unit configured to determine that an inverter overcurrent is abnormal and stop energization of the inverter, when a cumulative output time of the overcurrent flag of at least one phase reaches a time threshold, and
   the determination unit determines that there is the inverter overcurrent abnormality at the earliest timing of when a cumulative output time of the overcurrent flag reaches the time threshold for at least one phase, or when number of outputs of the overcurrent flag reaches a number threshold.

3. The abnormality detection apparatus according to claim 1, wherein
   in an initial check of the monitoring circuit,
   when the monitoring voltage output unit outputs a voltage larger than the reference value to the comparator as the monitoring voltage for diagnosis, the comparator outputs the overcurrent flag, and the determination unit determines that the inverter overcurrent abnormality occurs when the cumulative output time or number of outputs of the monitoring voltage for diagnosis satisfies an abnormality determination condition.

4. The abnormality detection apparatus according to claim 1, wherein
   the control unit or the monitoring circuit identifies a phase in which the upper arm element or the lower arm element is stuck in the ON state based on an output of the comparator for each phase.

5. The abnormality detection apparatus according to claim 2, wherein
   in an initial check of the monitoring circuit, when the monitoring voltage output unit outputs a voltage larger than the reference value to the comparator as the monitoring voltage for diagnosis, the comparator outputs the overcurrent flag, and the determination unit determines that the inverter overcurrent abnormality occurs when the cumulative output time or number of outputs of the monitoring voltage for diagnosis satisfies an abnormality determination condition.

6. The abnormality detection apparatus according to claim 2, wherein the control unit or the monitoring circuit identifies a phase in which the upper arm element or the lower arm element is stuck in the ON state based on an output of the comparator for each phase.

* * * * *